US012247365B2

(12) United States Patent
Amit et al.

(10) Patent No.: US 12,247,365 B2
(45) Date of Patent: *Mar. 11, 2025

(54) METHOD FOR ADJUSTING A HABITABLE STRUCTURE

(71) Applicant: Sea Top Homes LTD., Moshav Hemed (IL)

(72) Inventors: Aviel Amit, Holon (IL); Yeri Delenge, Hadera (IL); Amnon Shiloni, Shoham (IL)

(73) Assignee: Sea Top Homes Ltd., Moshav Hemed (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/219,761

(22) Filed: Jul. 10, 2023

(65) Prior Publication Data

US 2024/0117583 A1    Apr. 11, 2024

Related U.S. Application Data

(63) Continuation of application No. 17/713,292, filed on Apr. 5, 2022, now Pat. No. 11,739,489, which is a continuation of application No. 16/645,542, filed as application No. PCT/IL2018/051001 on Sep. 6, 2018, now Pat. No. 11,293,154.

(60) Provisional application No. 62/555,059, filed on Sep. 7, 2017.

(51) Int. Cl.
| *E02B 17/00* | (2006.01) |
| *E02B 17/02* | (2006.01) |
| *E02B 17/08* | (2006.01) |
| *E04B 1/343* | (2006.01) |
| *E04H 1/02* | (2006.01) |
| *E04H 9/02* | (2006.01) |
| *E04B 1/00* | (2006.01) |

(52) U.S. Cl.
CPC .............. *E02B 17/00* (2013.01); *E02B 17/02* (2013.01); *E02B 17/08* (2013.01); *E04B 1/34347* (2013.01); *E04B 1/34352* (2013.01); *E04H 1/02* (2013.01); *E04H 9/021* (2013.01); *E02B 2017/0043* (2013.01); *E02B 2017/0065* (2013.01); *E04B 2001/0061* (2013.01)

(58) Field of Classification Search
CPC .. E02B 17/02; E02B 17/08; E02B 2017/0065; E02B 2017/0043; E02B 17/00
See application file for complete search history.

(56) References Cited

U.S. PATENT DOCUMENTS 11,739,489 B2 *   8/2023   Amit ..................... E02B 17/02
                                                                405/197

FOREIGN PATENT DOCUMENTS

JP            2014218774     * 11/2014

* cited by examiner

*Primary Examiner* — Sean D Andrish
(74) *Attorney, Agent, or Firm* — Rivka Friedman

(57) ABSTRACT

A method for adjusting a marine or land habitation system to environmental conditions includes a method for moving a habitable chamber and a monopole column supporting the habitable chamber at a first end of the monopole column. The monopole column is controlled by motors. One motor moves the monopole column for moving the habitable chamber vertically, and the other motor rotates the habitable chamber to accommodate the wind direction.

2 Claims, 13 Drawing Sheets

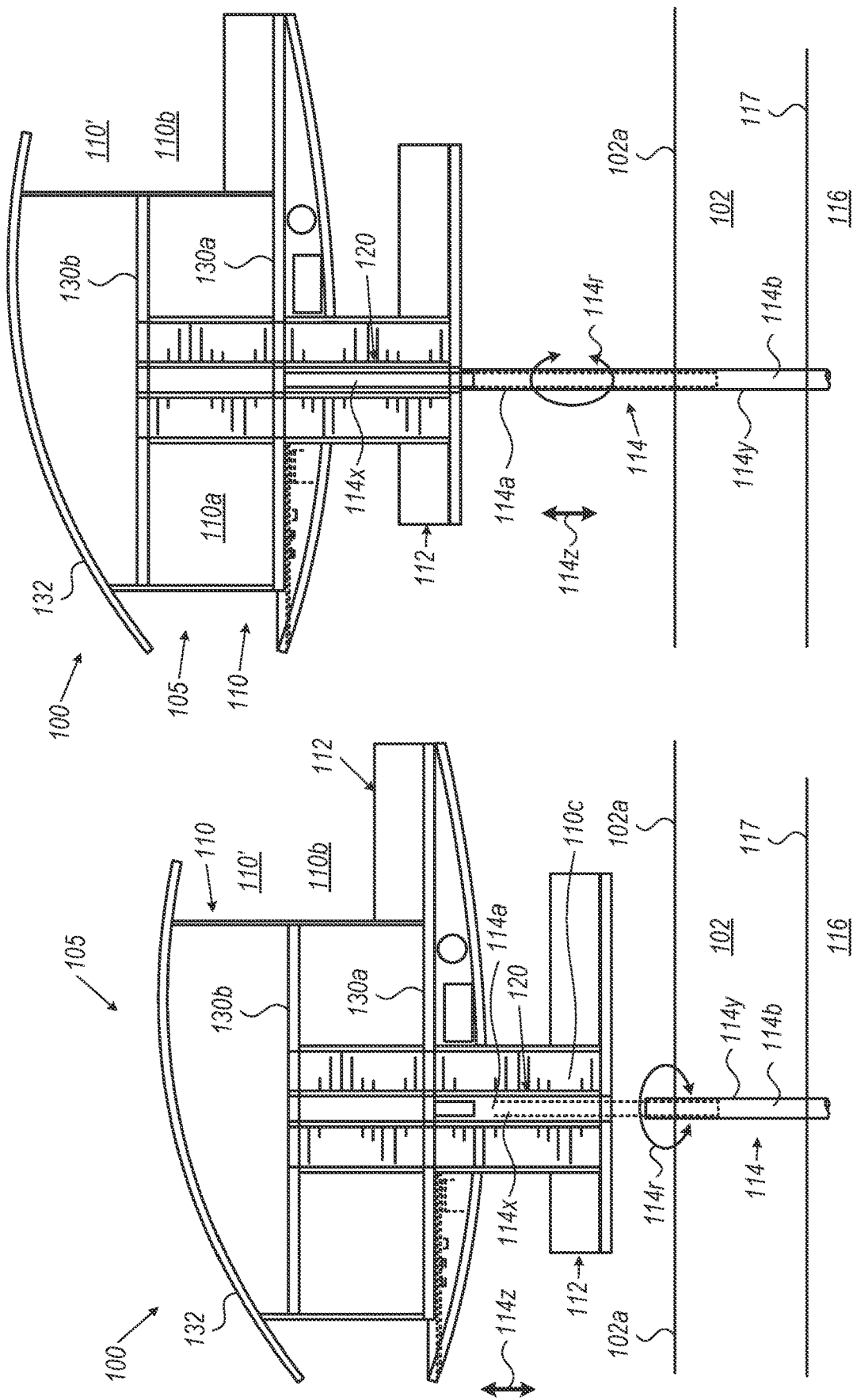

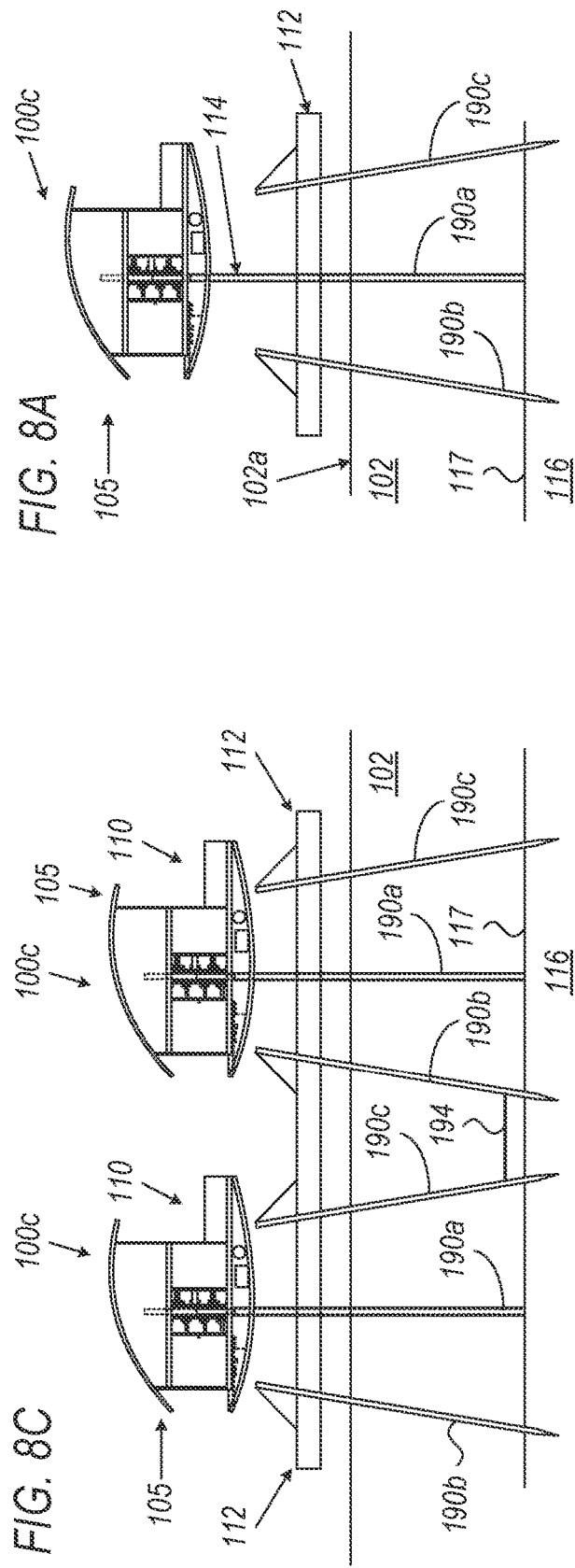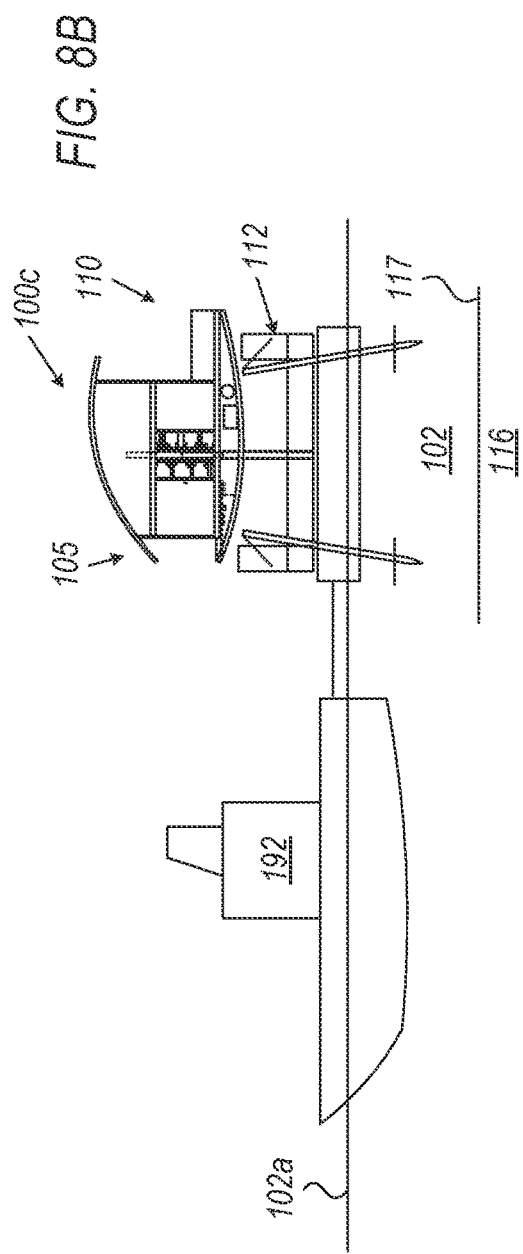

METHOD FOR ADJUSTING A HABITABLE STRUCTURE

CROSS-REFERENCES TO RELATED APPLICATIONS

This application is a Continuation Application of commonly owned U.S. patent application Ser. No. 17/713,292, entitled: Habitable Structure For Marine Environments, filed on Apr. 5, 2022, now U.S. Pat. No. 11,739,489, which is a Continuation Application of commonly owned U.S. patent application Ser. No. 16/645,542, entitled: Habitable Structure For Marine Environments, filed on Mar. 9, 2020, now U.S. Pat. No. 11,293,154, which is a § 371 of commonly owned PCT Application PCT/IL2018/051001, entitled: Habitable Structure For Marine Environments, filed on Sep. 6, 2018, which is related to and claims priority from commonly owned U.S. Provisional Patent Application Ser. No. 62/555,059, entitled: A Novel Non-Floating Marine Structure For An Open Sea, filed on Sep. 7, 2017, the disclosures of all of the aforementioned patent applications are each incorporated by reference in their entirety herein.

TECHNICAL FIELD

The present invention is directed to habitable structures in marine areas and other overwater environments.

BACKGROUND

Placing structures in the open sea is a complex and costly operation. The structures must have the ability to safely sustain waves, currents, storms, earthquakes, and winds, all conditions that can cause the structure to dislodge from its anchoring and worse, capsizing. To overcome these open sea conditions, contemporary solutions include, artificial islands, wave breakers, sea floor drilling and supplemental columns.

As a result of these engineering solutions, most open sea structures are large scale projects, such as oil and gas drilling rigs, wind power supports and communication structures, such as mounted transmitters and receivers. These projects typically require long term planning, along with huge financial and technical investments from public and private entities. However, these structures are not environmentally friendly.

SUMMARY OF THE INVENTION

The present invention is directed to providing small scale habitable units in marine environments, such as the open sea, which are inexpensive to assemble and maintain, while providing habitable space. The habitable units of the invention include a support structure with the strength needed to safely sustain waves, currents, storms, earthquakes, and winds, while maintaining the stability of the habitable unit. The habitable units of the present invention are anchored to the sea floor, and do not float on the water (e.g., sea), so as to be non-floating.

The habitable units of the invention are environmentally friendly, as they have a small footprint, limiting shading of the sea, and these structures do not change or alter the character of the sea floor and seabed, in which they are mounted. Additionally, the habitable units do not alter wave and current patterns and are adaptable to their marine or sea environments.

Embodiments of the invention are directed to a marine habitation system. The system comprises: a habitable chamber; and, a column in communication with the habitable chamber at a first end and including a second end, opposite the first end, for mounting in the seabed, wherein the chamber is moveable with respect to the column to adjust for variable sea water levels.

Optionally, the column includes a portion in communication with a platform of the habitable chamber, the portion configured for moving vertically to adjust the height of the habitable chamber.

Optionally, the habitable chamber includes a moveable portion in communication with the column for moving the habitable chamber with respect to the column.

Optionally the column portion is additionally configured to be rotatable for rotating the habitable chamber.

Optionally, the moveable portion of the habitable chamber is additionally configured to be rotatable for rotating the habitable chamber.

Optionally, the first end of the column for mounting in the seabed is such that the column is configured for anchoring in the seabed.

Optionally, the habitable chamber additionally comprises a cover over at least a portion of the platform.

Optionally, the marine habitation system additionally comprises a sink resistant base for supporting the column.

Optionally, the sink resistant base includes an opening, and, the supporting the column includes receiving the column in the opening, such that the column extends through the opening.

Optionally, the column extends through the opening and into the seabed.

Optionally, the sink resistant base includes oppositely disposed first and second sides, the first side for supporting the column, and the second side including an additional column extending from the second side.

Optionally, the marine habitation system additionally comprises at least one first anchor tethered to at least one of the columns or the habitable chamber.

Optionally, the marine habitation system additionally comprises at least one second anchor in communication with the at least one first anchor.

Optionally, the marine habitation system is such that the tethering includes at least one shock absorber.

Optionally, the marine habitation system is such that the tethering is adjustable in its length to maintain the column in a vertical orientation.

Embodiments of the invention are directed to constructing a marine habitation system. The construction method comprises: obtaining a habitable chamber and a column, the column including oppositely disposed first and second ends; mounting the first end of the column in the seabed; and, placing the habitable chamber into communication with the second end of the column, for moving the habitable chamber with respect to the column.

Optionally, the column is configured for at least one of: moving the chamber substantially vertically and rotating the chamber.

Optionally, the habitable chamber is configured for at least one of: moving substantially vertically with respect to the column and rotating about the column.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 2A and 2B are longitudinal cross-sectional schematic views of the apparatus of FIG. 1 where the housing is at different heights;

FIG. 8A is a diagram of a fourth embodiment of the apparatus of the present invention;

FIG. 8B is a diagram showing deployment of the apparatus of FIG. 8A:

FIG. 8C is a diagram showing apparatus of FIG. 8A joined together;

An Appendix A is attached to this document.

DETAILED DESCRIPTION OF THE DRAWINGS

Figure 4:
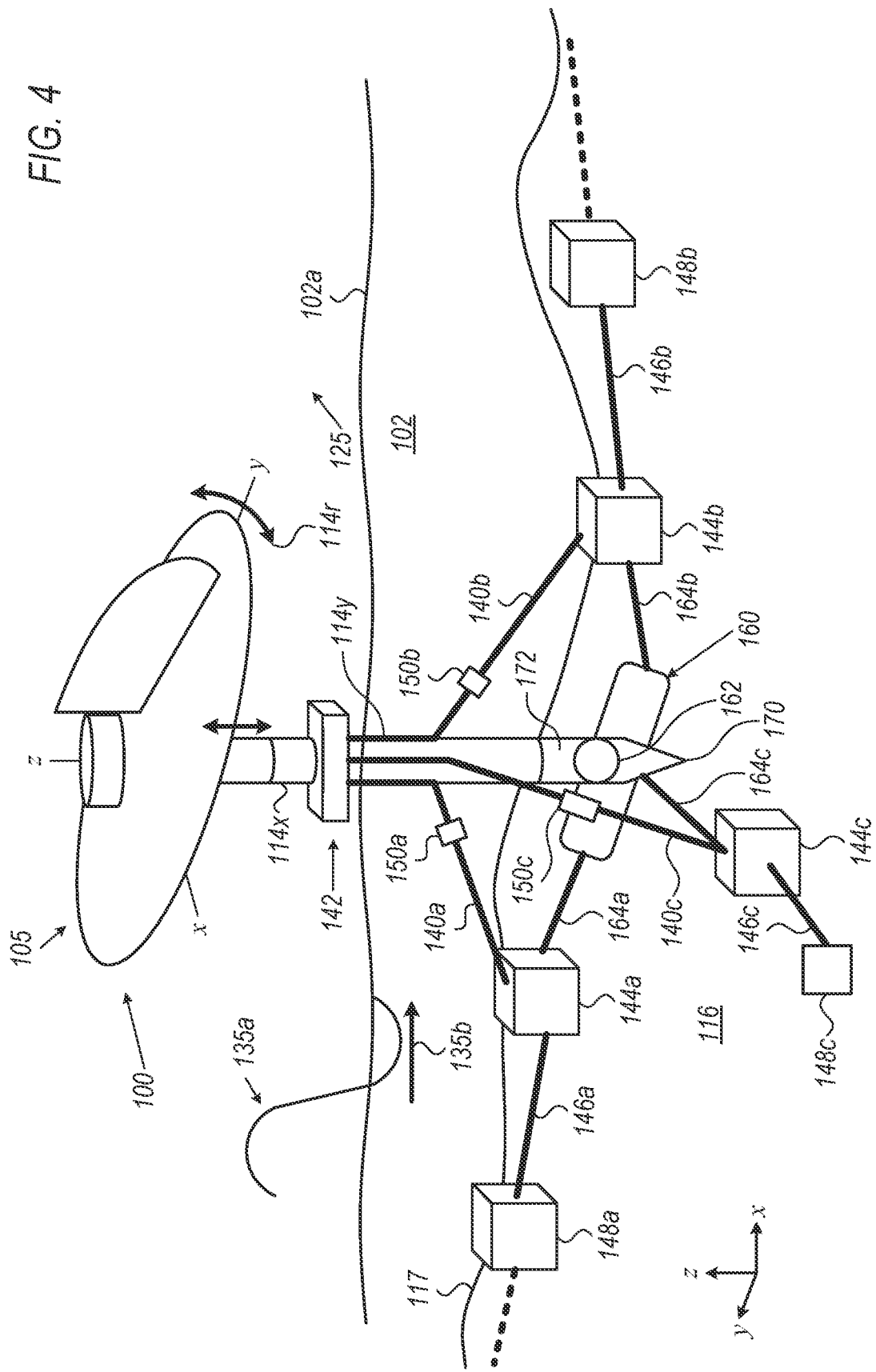
FIG. 4 is a diagram for the mounting and anchoring of the apparatus of FIG. 1 in the sea floor.

Throughout this document terms of orientation, such as up, upward, down, downward, vertically and horizontally are used. The use of these terms is for explanation purposes, and is not in any way limiting. Additionally, orientations are references along x, y, z axes, where the x and y axes are coplanar, and the z axis, defining the vertical, extends perpendicular to the plane formed by the x and y axes, as shown in FIG. 4.

Figure 1:
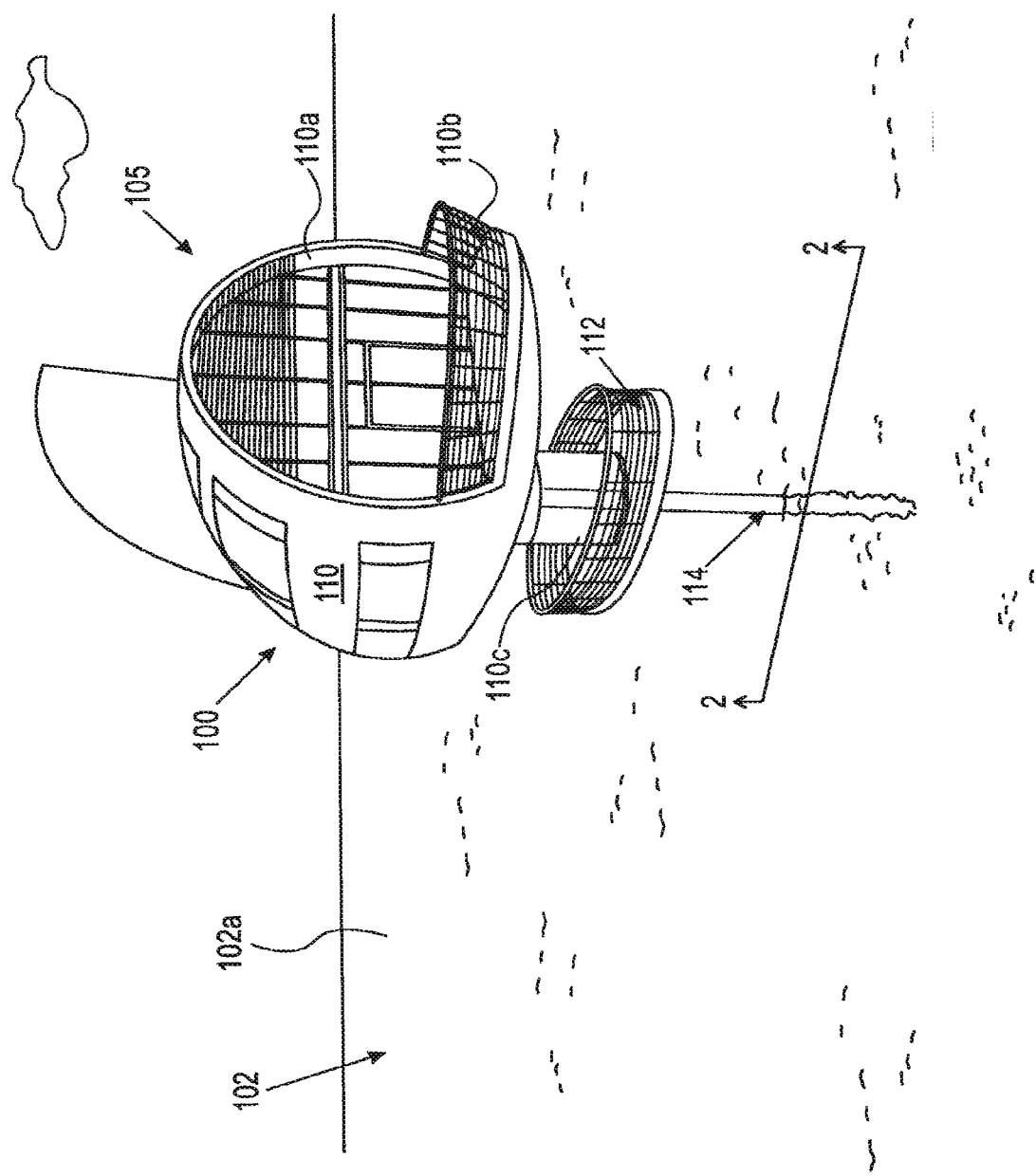
FIG. 1 is a perspective view of an apparatus as deployed in a marine environment, in accordance with embodiments of the present invention.

FIG. 1 shows an apparatus 100 as a habitation unit in open water 102, such as a marine environment, including, for example, a sea, river, ocean, lake, lagoon, or any other body of water and the like. The apparatus 100 is of a housing or housing unit 105, including a habitable chamber 110 (hereinafter "chamber"), and a lower platform 112. The chamber 110 includes an interior 110a, an optional balcony 110b, with a passageway 110c, for example, extending from the interior 110a to the platform 112, and includes stairs and the like. The chamber 110 is adapted for accommodating humans, animals, and the like. The platform 112, for example, serves as an egress point, such as a walkway, from the chamber 110, as well as a dock, or the like. The apparatus 100 includes a column 114, which supports the housing unit 105. The column 114 extends below the water level 102a or water line, and is mounted in the seabed 116, below the sea floor 117, and anchored to the sea floor 117. Throughout this document, the "sea floor" is the ground surface under the water, and, the "seabed" is the ground itself extending to the center of the Earth, under the sea floor.

FIGS. 2A and 2B show the apparatus 100 in schematic views in cross section. The chamber 110, and its platform 112, attach to a mounting unit 120, which receives the column 114, at a first (upper) end of the column 114a. The column 114 is mounted in the seabed 116, at its second (lower) end 114b, opposite the first end 114a, and the second end 114b of the column 114 extends into the seabed 116, a sufficient distance, for example, approximately 20 meters, to maintain the column 114 in its vertical orientation.

The column 114 is, for example, oriented to define the Z axis of the apparatus 100, and is moveable vertically (along the z-axis), as indicated by the double headed arrow 114 z, and is also moveable rotatably (rotatable about the z-axis), as indicated by the arrow 114r. The column 114 includes a segment 114x that is moved vertically by a motor (not shown) or other movement mechanism, and extends from the body 114y of the column 114. The column 114 is moveable vertically, both up and down, for example, to be above the water level 102a, and to accommodate changes in the water level 102a. The chamber 110 and platform 112 can be moved upward, from a first position or height, as shown in FIG. 2A, to a second position, or height, greater than the height of the first position, as shown in FIG. 2B. The column 114, via the segment 114x, is rotatable (by the motor or other movement mechanism), such that the chamber 110 and platform 112 may be rotated along a 360 degree arc (double-headed arrow 114r). For example, as shown in FIGS. 2A and 2B, the chamber 110 and platform 112 have been rotated to accommodate the wind direction (represented by the arrow 125) creating a protected area 110' for the chamber 110.

Figure 3A:
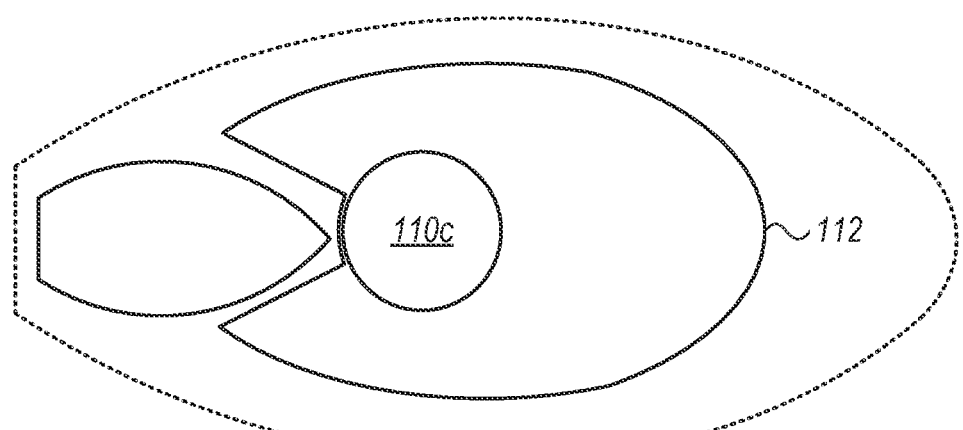
FIGS. 3A, 3B, and 3C are transverse cross-sectional views of the housing of FIG. 1.
Figure 3B:
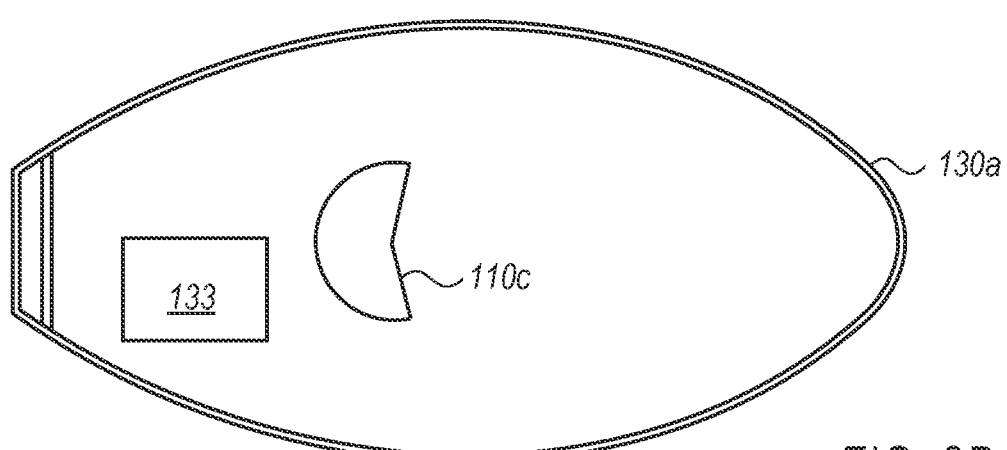
Figure 3C:
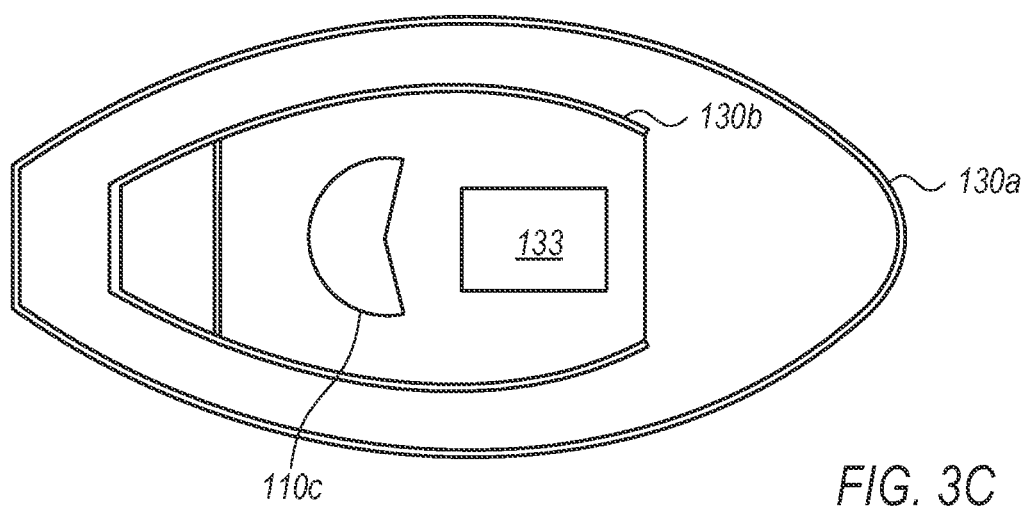

Turning also to FIGS. 3A, 3B, and 3C, the apparatus 100 is shown as example levels. As indicated above, a first level (FIG. 3A) includes the platform 112. The chamber 110 includes a base level 130a (FIG. 3B), and an upper level 130b (FIG. 3C), and is covered by a roof 132 or cover. The roof 132 is, for example, a curved shape, so as to be aerodynamic, to face and accommodate winds. There may also be an open or uncovered portion 110b, which serves as a balcony. The enclosed portion of the chamber 110 defines the interior 110 a, such that the chamber 110 is enclosed from the elements, so as to be habitable by humans, pets, animals, and the like. The interior 110a of the chamber 110, for example, includes rooms such as bedrooms 133, and is such that it can accommodate furniture, appliances, electricity and plumbing, so as to be habitable by humans.

FIG. 4 shows an example mounting and anchoring of the column 114 in the seabed 116, and on the sea floor 117, respectively. The anchoring of the column 114 includes a tensioning system maintaining the column 114 vertical (e.g., parallel to the z axis) at all times, so as to keep the housing 105 horizontally balanced (horizontal with respect to the x-y plane), at all times. The tensioning system includes cables 140a-140c, which are attached or tethered (the terms "attached" and "tethered" used interchangeably herein, when referring to the connections of the anchors) at one end to pulleys 187 (not shown on the column 114, element 187 in FIG. 5) on a tensioning collar 142, and at the other or opposite end to anchors 144 $a$-144 $c$. The elements of wind (arrow 125), waves 135$a$ and water current (arrow 135$b$) are shown with respect to the apparatus 100 including column 114.

The pulleys 187 adjust tensioning in the cables 140$a$-140$c$. The cables 140$a$-140$c$ are tightened or released by being taken up or released by the pulleys 187 (FIG. 5) or other take up mechanisms driven by motors 186$c$ (FIG. 5), either attached to the column 114, or on the tensioning collar 142. The pulleys 187 are also moved to control the tension in the cables 140$a$-140$c$, to keep the column 114 vertical, for example, in response to forces from currents, waves, tides, earthquakes and the like, exerted on the column 114. The anchors 144$a$-144$c$ serve as primary or first anchors, as each primary anchor 144$a$-144$c$ is optionally attached, by cables 146$a$-146$c$, to one or more secondary or second anchors 148$a$-148$c$.

Shock absorbers 150$a$-150$c$ are, for example, positioned along the cables 140$a$-140$c$ for providing elasticity to the cables 140$a$-140$c$, and reducing forces applied to the apparatus 100, while providing additional stability to the apparatus 100. For example, the cables 140$a$-140$c$ are typically taught, and the shock absorbers 150$a$-150$c$ exhibit spring-like behavior to introduce some "play" into the cables 140$a$-140$c$.

The cables 140$a$-140$c$, 140 (FIGS. 10A-10C), 146$a$-146$c$, 146 (FIGS. 10A, 10B and 10C) are for example, standard marine cables, made of metal or synthetic ropes, including cables and/or ropes made from Dyneema.® SK78, from DSM Dyneema B. V., Urmonderbaan 22 6167 RD Geleen, The Netherlands.

While a tensioning collar 142 is shown, in alternate embodiments, the pulleys 187 can be directly attached to the column 114 or attached to the chamber 110. Also, while three anchors 144$a$-144$c$ c are shown, any number of anchors, typically three or more, is suitable. Additionally, the secondary anchors 148$a$-148$c$ are, for example, attached to other secondary anchors, associated with other apparatus 100, when multiple apparatus 100 are joined together. These secondary anchors 148$a$-148$c$ may also be attached to other primary anchors, when multiple apparatus 100 are joined together. The same holds true for the primary anchors 140$a$-140$c$.

Various example anchoring arrangements including calculations associated therewith are provided in Appendix A, in FIGS. A-1, A-2 and A-3, attached to this document, Optionally, there may be a column base plate 160, mounted in or on the sea floor 117 which includes an aperture or opening 162 for receiving the column 114 (column body 114$y$). The base plate 160 is sink resistant, as it prevents the column 114 from sinking into the seabed 116. Additional cables 164$a$-164$c$, attach the base plate 160 to the anchors 144$a$-144$c$. Optionally, the column 114 at its lower end 114$b$ terminates in a conical point 170, for easier penetration into the sea bed 116. This conical point 170 also serves as an anti-drag pin. The column 114 or the column base plate may also include a ball joint 172, which accommodates an uneven sea floor 117, and maintains the column 114 in a stable position in a vertical orientation, with respect to the water line of the water surface 102$a$.

Optionally, the column base plate 160 may receive the column 114 on its upper (water 102 facing) side and another column extends from the lower (seabed 116 facing) side and into the seabed 116, for mounting the apparatus 100.

Optionally, the apparatus 100 may be mounted in the seabed 116 by only the column 114, without any anchors, such as the aforementioned primary anchors 144$a$-144$c$ and secondary anchors 148$a$-148$c$.

Figure 5:
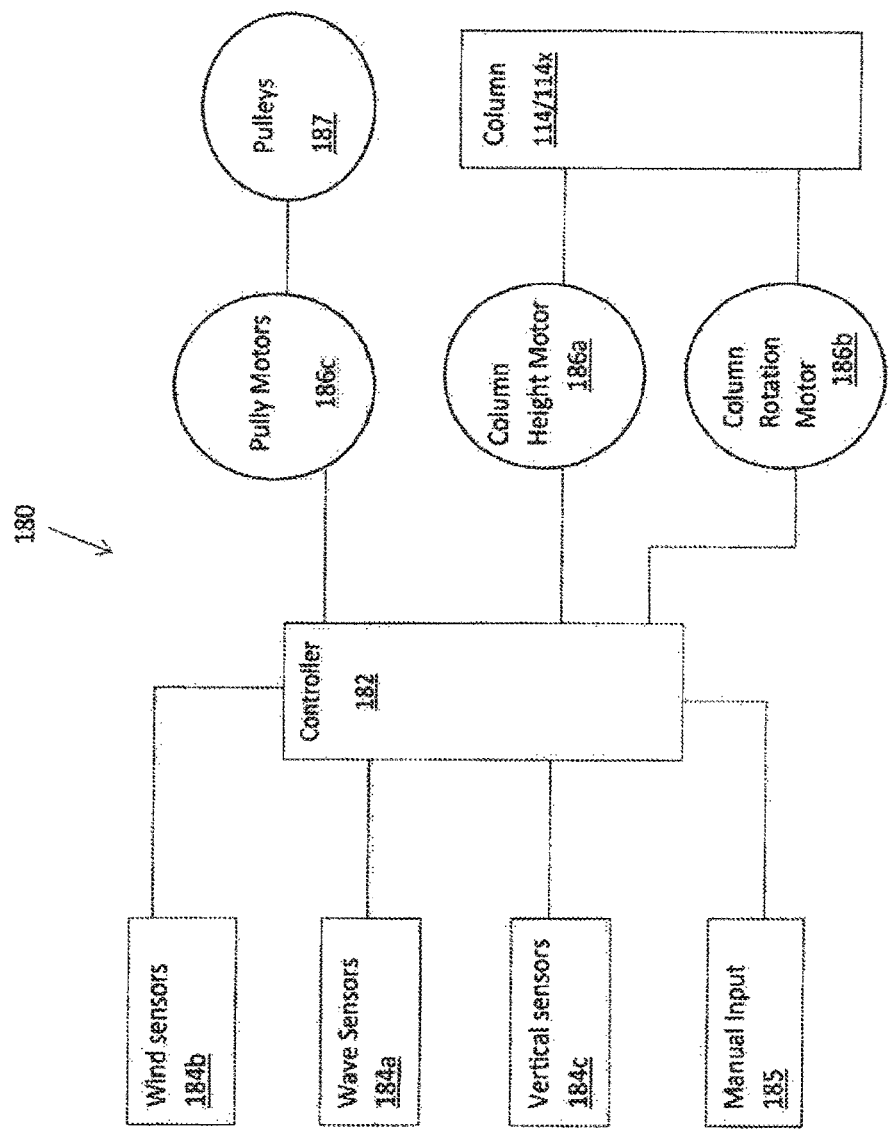
FIG. 5 is a schematic diagram of a control system for the apparatus of FIG. 1.

As shown in FIG. 5, the apparatus 100 may include sensors and a control system 180, which is processor based, to move the column 114 vertically, adjusting the height of the chamber 110 and/or platform 112, rotating the chamber 110, and/or the platform 112, and maintaining the column 114 in its vertical orientation, by adjusting the tension on the cables 140$a$-140$c$. The control system 180 includes a processor based controller 182, which is in electronic and/or data communication with sensors 184$a$-184$c$, and a manual input unit 185, and motors or movement mechanisms 186$a$, 186$b$, 186$c$. A first motor 186$a$ is for moving the column 114 (column segment 114$x$) vertically. A second motor 186$b$ is for rotating the column 114 (column segment 114$x$), so as to rotate the chamber 110, and a third motor(s) is for rotating the pulleys 187. For example, the control system 180 is dynamic, in that it operates continuously, by continuously sensing conditions associated with the apparatus 100, and making instantaneous adjustments, for example, automatically and in real time.

For example, there are wave sensors 184$a$, mounted on the apparatus 100, for example, along the column 114 or on the housing 105, which detect the wave or water level 102$a$ height, and send this data to the controller 182. The controller 182 then calculates the increase or decrease in height and signals the column 114 (column segment 114$z$) motor 186$a$ to move correspondingly upward or downward. There are wind sensors 184$b$, mounted on the apparatus 100, for example, along the column 114 or on the housing 105, which detect the wind speed and/or wind direction, send this data to the controller 182. The controller 182 then calculates the rotation of the column 114 (column segment 114$x$) which minimizes wind resistance and signals the column 114 (column segment 114$x$) rotation motor 186$b$, to rotate the corresponding arc length for wind resistance or defense. There are vertical sensors 184$c$, mounted on the apparatus 100, at the column 114, which detect vertical movements in the column 114. This sensed data is sent to the controller 182. The controller 182 then calculates the rotation of the pulley 187 to control cable 140$a$-140$c$ tensioning, e.g., take up or release cable 140$a$-140$c$ to offset any opposite vertical movement and keep the column 114 vertical.

There is also a manual input 185, through which a user can activate the controller 182, so as to manually control chamber 110 positioning, vertical height and rotation, as well as column 114 vertical adjustments, via cable tensioning. This manual input 185 may be a computerized device, such as a smart phone, iPad®, keyboard mounted in the chamber 110, or other device which links to the controller 182 via an on-line or link, such as over networks, such as the Internet, cellular, satellite communication networks, and the like, or over a wired link, in the case of the keyboard.

The aforementioned sensors 184$a$-184$c$ may also be located remote to the apparatus 100. For example, in the case of multiple apparatus 100 joined together, the sensors 184$a$-184$c$ can be at a central location, with respect to all of the apparatus 100.

In alternate embodiments, the column segment 114$x$ may be part of the housing 105 and attach to the column body 114$y$. This column segment 114$x$ of the housing 105 vertically moves (along the z axis) and/or rotates the chamber 110 and/or the platform 112, as detailed above.

In other alternate embodiments, the column 114 accommodates the chamber 110 and platform 112, such that they move vertically and rotatably independent of each other.

FIGS. 6, 7, 8A-8D and 9 show alternate apparatus 100a-100d, which are similar in construction to apparatus 100, with corresponding elements being numbered the same as for apparatus 100, and in accordance with that described above.

Figure 6:
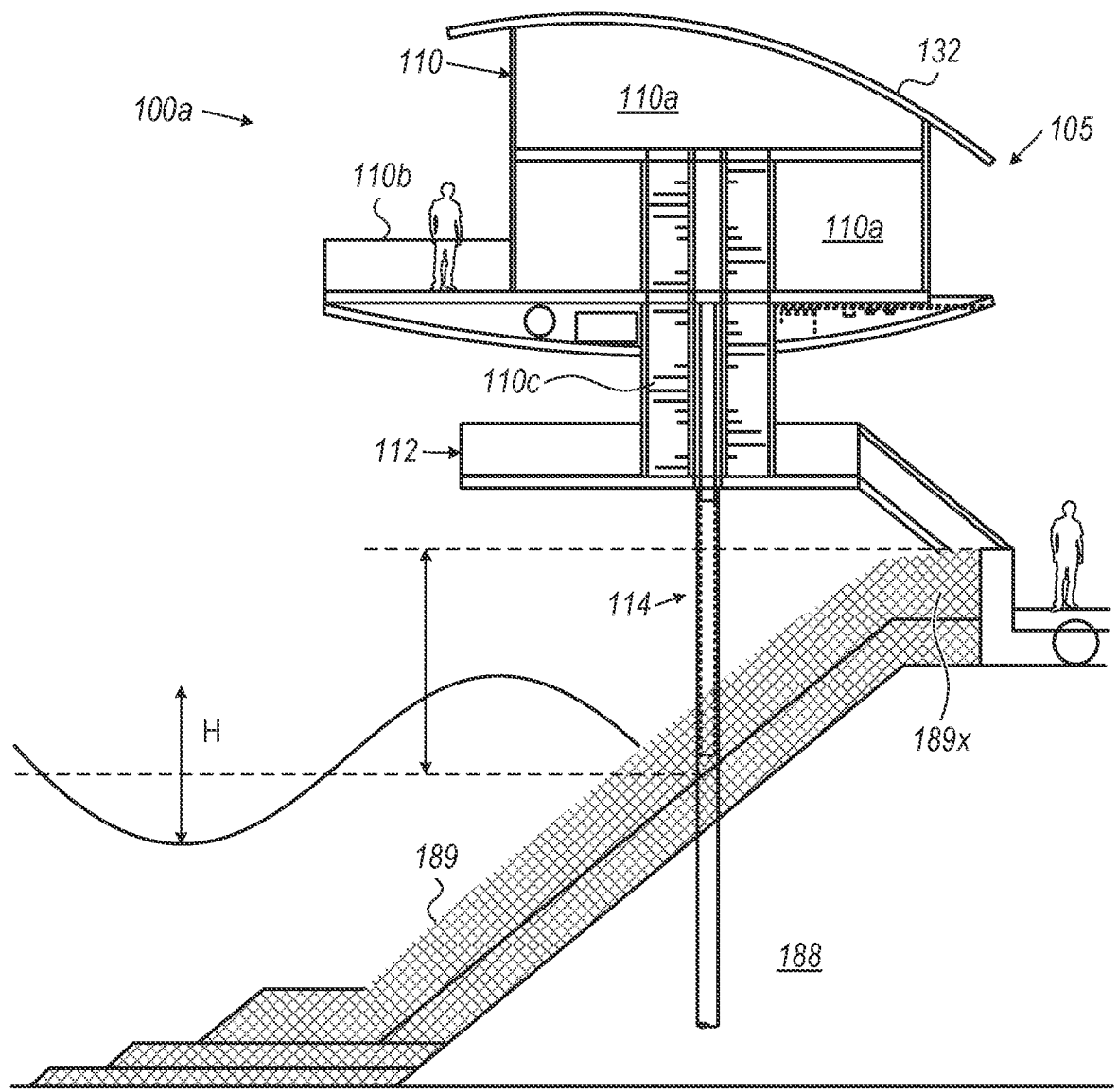
FIG. 6 is a diagram of a second embodiment of the apparatus of the present invention.

In FIG. 6, apparatus 100a is mounted in the ground 188 of a breakwater 189, which is close to the shoreline. The platform 112 extends to the shoreline or to the breakwater upper surface 189x. The mounting into the ground 188 is similar to that shown for the apparatus 100 in FIGS. 2A and 2B.

Figure 7:
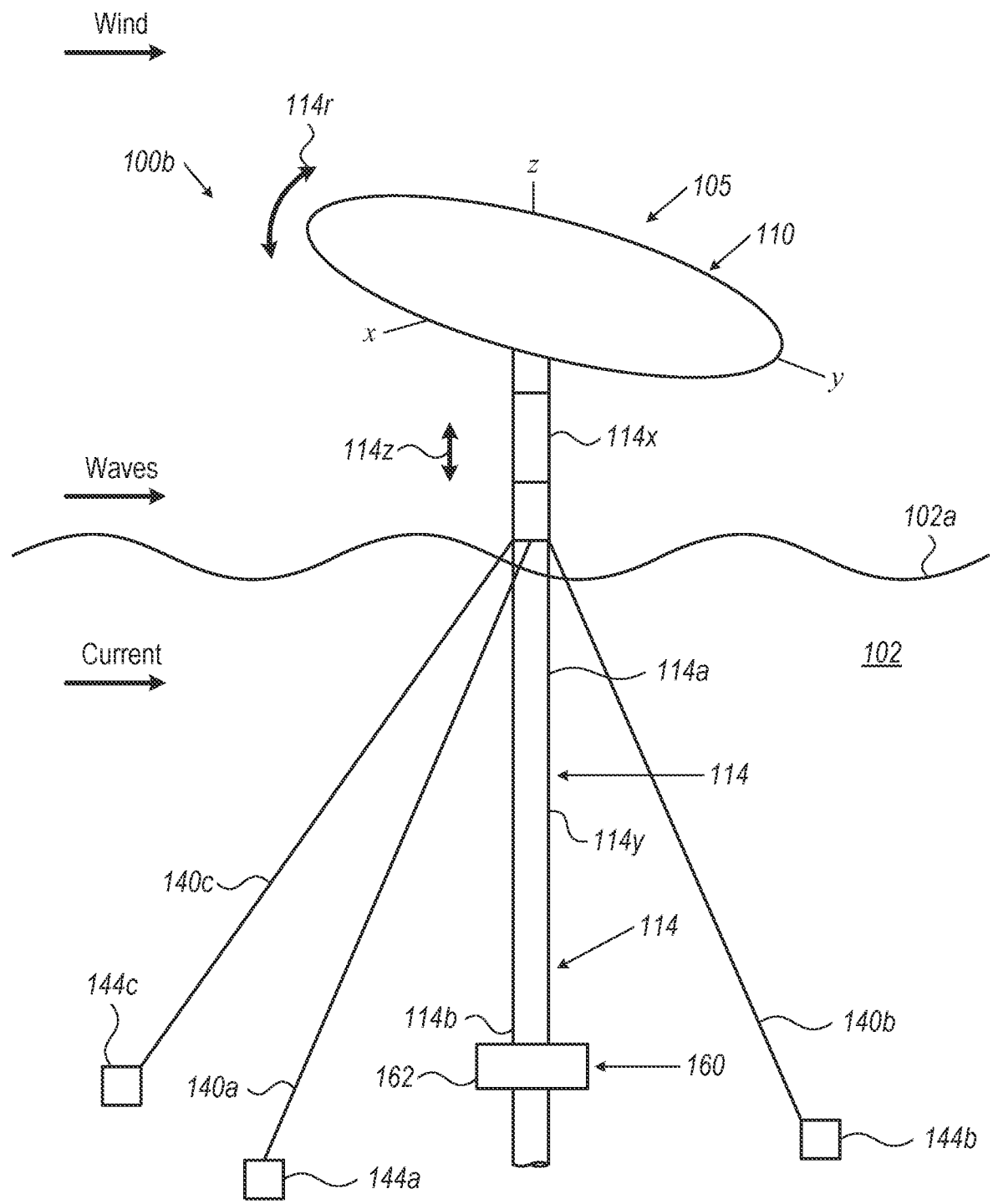
FIG. 7 is a diagram of a third embodiment of the apparatus of the present invention.

In FIG. 7, the apparatus 100b is such that the column 114 is above or in contact with the sea floor 117. The column 114 is held in place by anchors 144a-144c tethered to the column 114, for example, at pulleys 187 FIG. 5, not shown in FIG. 7) by cables 140a-140c. The anchors 144a-144c are typically primary anchors, as each anchor 144aa-144c is optionally also tethered, via a cable or the like, to at least one secondary anchor (not shown), similar to secondary anchors 148a-148c.

FIG. 8A the apparatus 100c is such that the column 114 is mounted on the platform 112, in a manner where the column 114 is movable vertically and rotatably, to move the chamber 110 vertically and rotatably, in accordance with that detailed above. Legs 190a-190c extend from the platform 112 into the sea floor 117 to mount the apparatus 100c in the sea floor 117. The three legs 190a-190c are independent of each other to accommodate unevenness of the sea floor 117 (and the seabed 116 under the sea floor 117). The legs 190a-190c may be supported by anchors (not shown), primary and/or secondary, as detailed above.

As shown in FIG. 8B, the apparatus 100c can be towed to its location by a boat or the like 192, where during towing the legs 190a-190c are up and not in contact with the sea floor 116. Once the location for the apparatus 100c is reached, the legs 190a-190c are deployed, by being extended downward from the platform 112 into the sea floor 117. The legs 190a-190c may then be mounted in the seabed 116 and/or anchored on the sea floor 117 with the primary and/or secondary anchors, as detailed above.

Figure 8D:
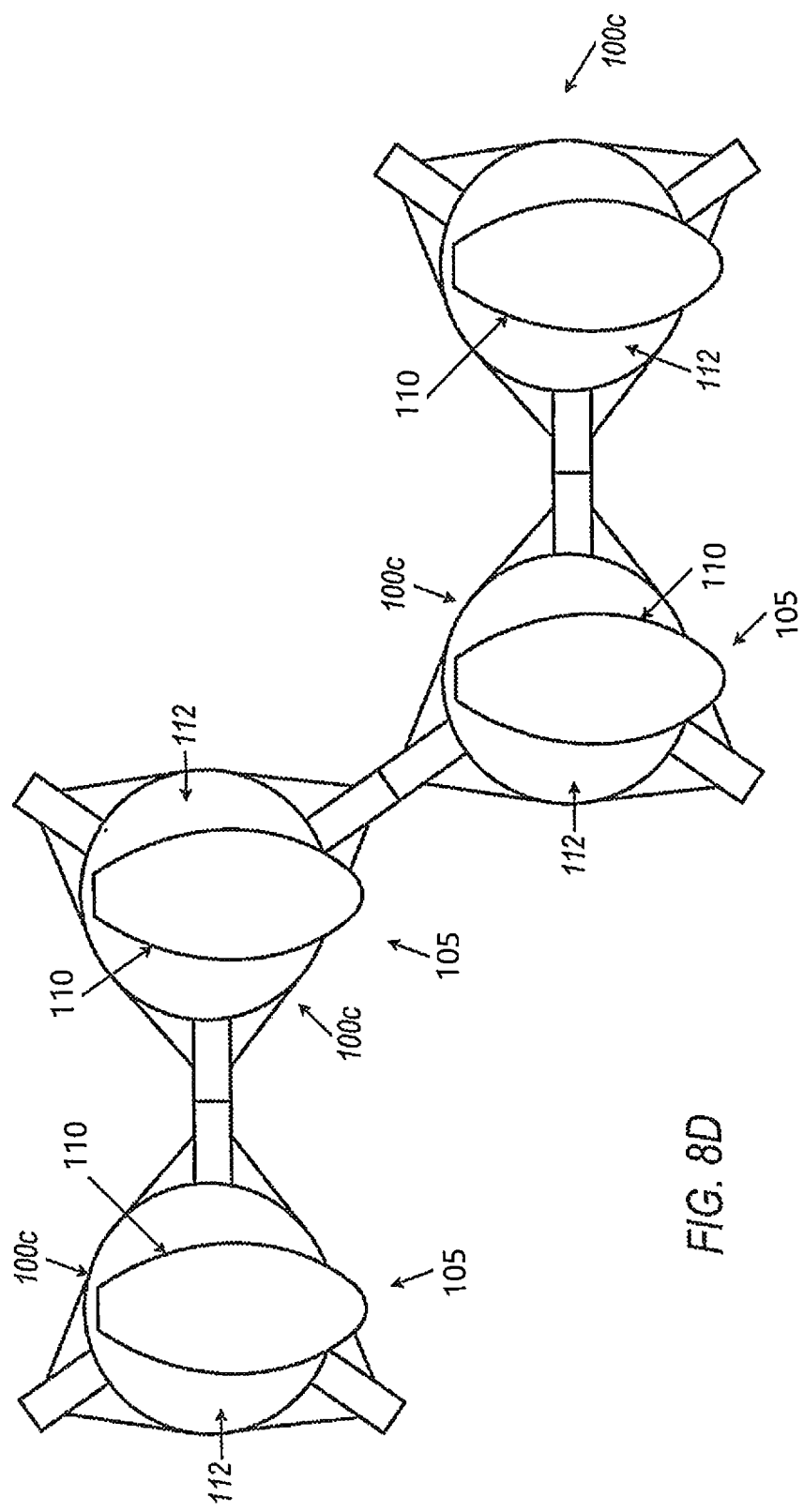
FIG. 8D is a diagram showing multiple apparatus of FIG. 8A joined together.

FIG. 8C shows two apparatus 100 c joined together at the legs 190a-190c by being tethered together by a cable 194 or the like. FIG. 8D shows the chambers 110 of the apparatus 100c, when the apparatus 100c are connected to each other in accordance with that shown in FIG. 8C.

Figure 9:
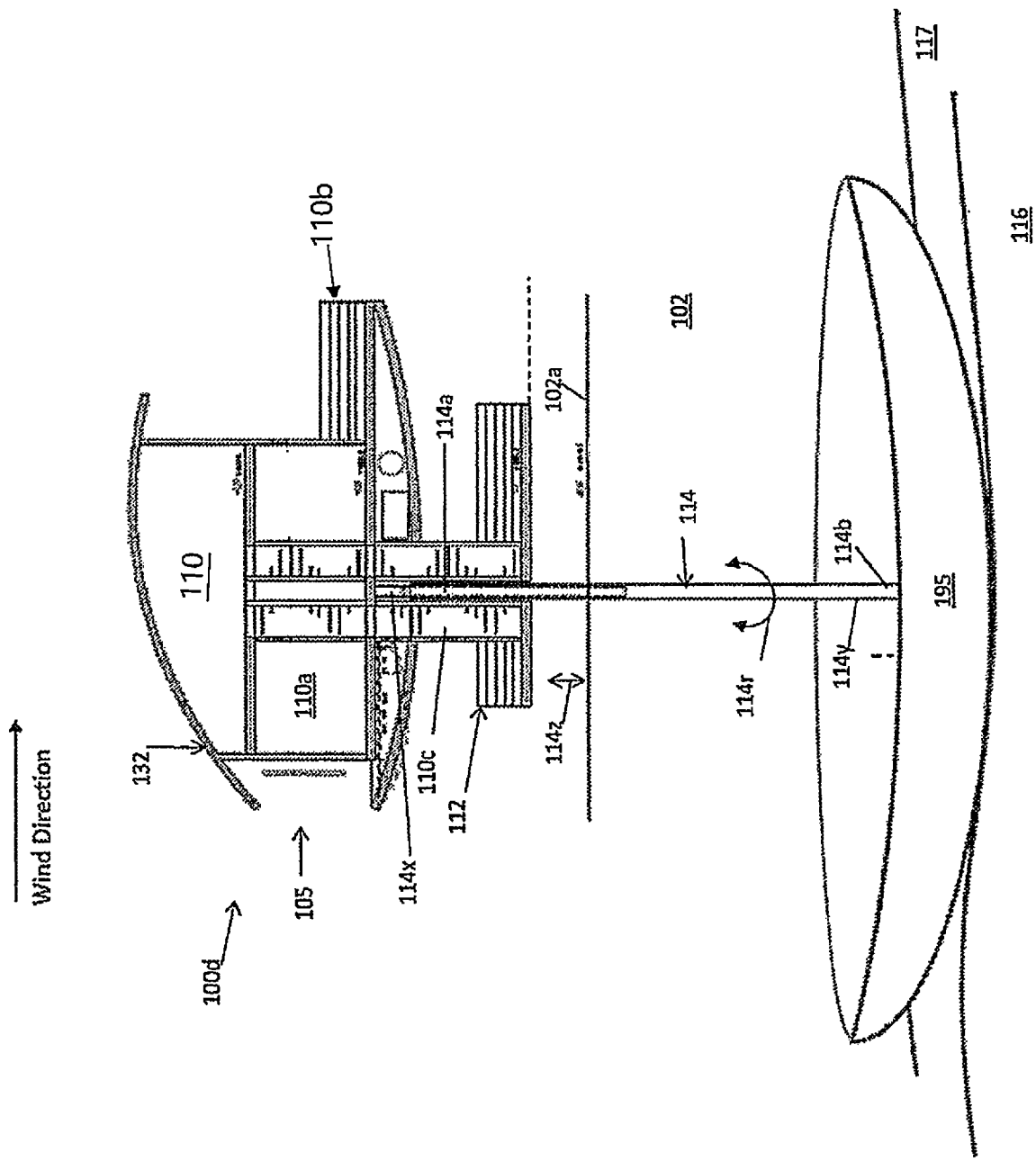
FIG. 9 is a diagram of a fifth embodiment of the apparatus of the present invention; and, FIGS. 10A-10C are diagrams of grids for multiple apparatus of the invention joined together.

FIG. 9 shows an apparatus 100d similar to the apparatus 100 of FIGS. 2A and 2B, except that the column 114 is mounted in a dish-like receptacle 195. The receptacle 195 sits on the sea floor 117 but may be sunk or otherwise placed into the seabed 116.

Figure 10A:
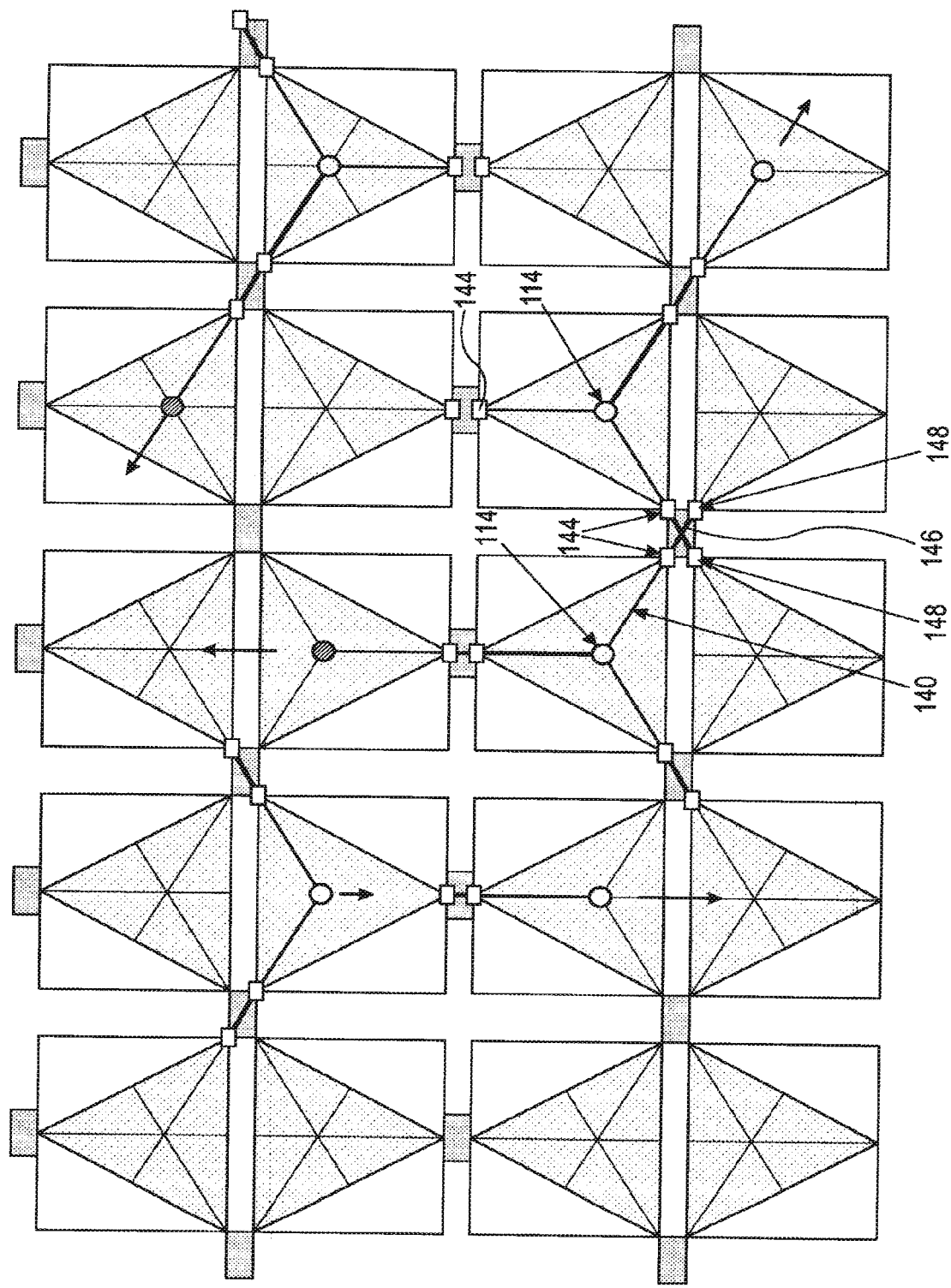
Figure 10B:
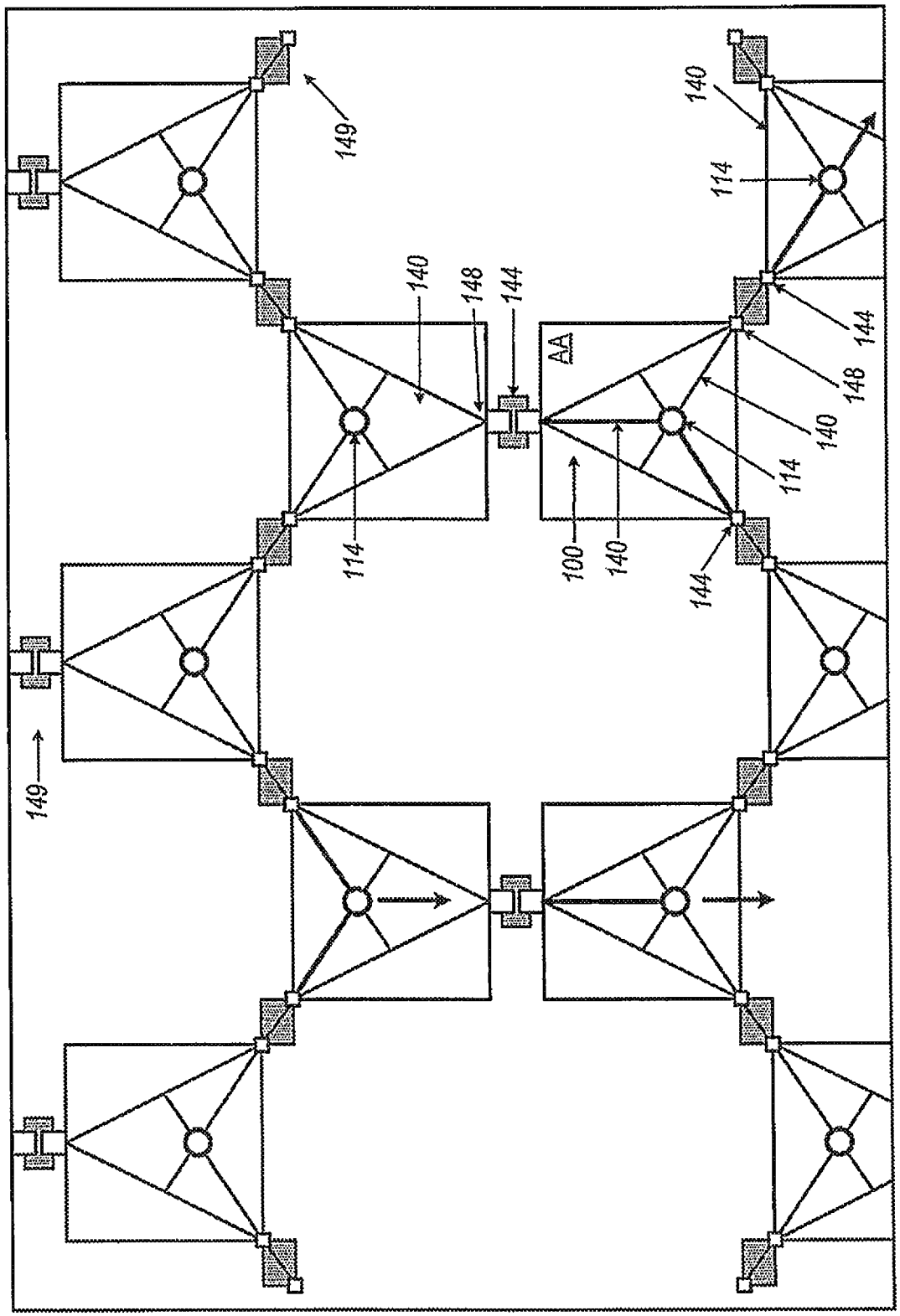
Figure 10C:
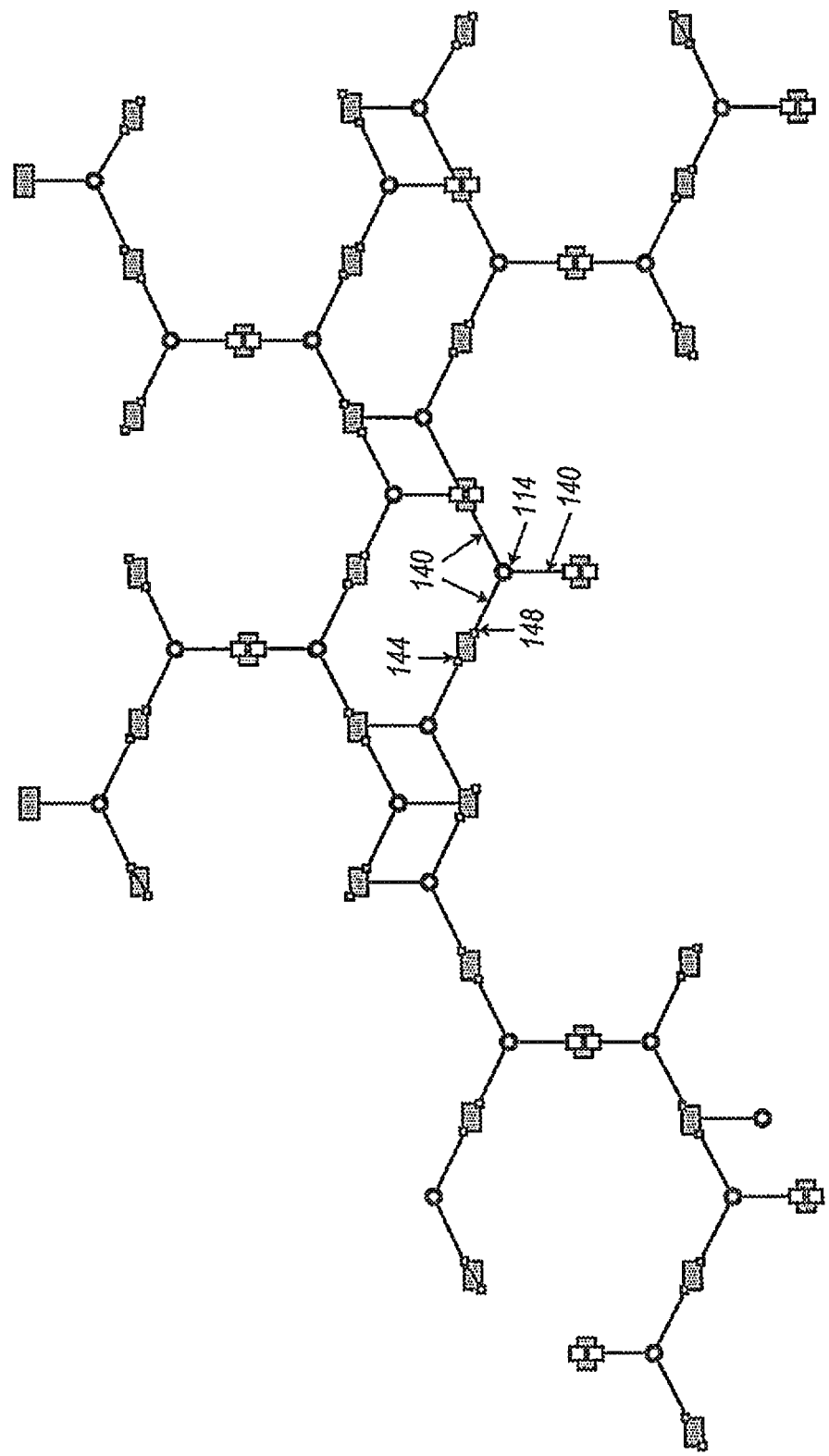

FIGS. 10A, 10B and 10C are examples of apparatus 100, as implemented in various grid patterns in a system. In FIG. 10A, the apparatus 100 (represented by columns 114) are tethered together (by a cable 140) via primary 144 and secondary 148 anchors. In FIGS. 10B and 10C, the apparatus 100 (represented by columns 114) are tethered together (by a cable 140) via primary 144 (apparatus 100 of block AA as shown by dark lines for the cable 140) and secondary 148 (apparatus 100 of block AA as shown by light lines for the cable 140) anchors where a secondary anchor 148 for one apparatus 100 is a primary anchor 144 for another apparatus 100. Border anchors 149 are at the perimeter of the system.

While the apparatus 100 of the invention have been shown in a marine environment, the apparatus 100 may also be adapted and used on dry land and swamps, in accordance with that detailed above.

Although the invention has been described in conjunction with embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method for adjusting a habitable structure comprising:
   providing a habitation system comprising:
      a habitable chamber;
      a monopole including a single column, the column including:
         a first end in communication with the habitable chamber; and
         a second end, opposite the first end, the second end for mounting in a sea bed;
      a first motor in communication with the column for moving the habitable chamber substantially vertically; and
      a second motor in communication with the column for moving the habitable chamber rotationally;
   tethering the column to a plurality of anchors in contact with a surface, each anchor tethered via one or more cables; and
   activating at least the second motor to rotate the habitable chamber to accommodate a wind direction and creating a protected area for the habitable chamber.

2. The method of claim 1, wherein the surface includes the sea bed.

* * * * *